(12) United States Patent
Metlitzky et al.

(10) Patent No.: US 6,809,636 B2
(45) Date of Patent: Oct. 26, 2004

(54) VEHICLE IMMOBILISER/ALARM

(75) Inventors: Ivor Metlitzky, Sorrento, WA (US); Richard Thomas Frizell, Kingsley, WA (US)

(73) Assignee: Dynamco PTY LTD, East Perth (AU)

( * ) Notice: Subject to any disclaimer, the term of this patent is extended or adjusted under 35 U.S.C. 154(b) by 0 days.

(21) Appl. No.: 10/428,302

(22) Filed: May 2, 2003

(65) Prior Publication Data

US 2004/0051631 A1 Mar. 18, 2004

(30) Foreign Application Priority Data

Sep. 16, 2002 (AU) ......................... 2002951399
Sep. 16, 2002 (AU) ......................... 2002951402

(51) Int. Cl.[7] ............................................. B60R 25/10
(52) U.S. Cl. ..................... 340/426.11; 340/426.11; 340/5.1; 340/5.22; 340/5.21; 340/5.61; 307/10.2; 180/287
(58) Field of Search .................. 340/426.11, 426.1, 340/5.1, 5.22, 5.21, 5.61, 5.8, 825.52; 307/10.2, 10.1; 180/287; 235/382, 382.5

(56) References Cited

U.S. PATENT DOCUMENTS

| | | | |
|---|---|---|---|
| 5,270,577 A | 12/1993 | Yamaguchi et al. | 307/26 |
| 5,517,187 A | 5/1996 | Bruwer et al. | 340/825.3 |
| 5,539,388 A | 7/1996 | Modgil | 340/825.17 |
| 5,675,490 A * | 10/1997 | Bachhuber | 701/32 |
| 5,677,663 A | 10/1997 | Sansome | 340/426 |
| 6,206,130 B1 | 3/2001 | Hetler | 180/287 |
| 6,337,620 B1 | 1/2002 | Chen | 340/310.01 |
| 6,552,648 B1 * | 4/2003 | Rick et al. | 340/5.1 |
| 6,583,712 B1 * | 6/2003 | Reed et al. | 340/5.21 |
| 6,603,388 B1 * | 8/2003 | Perraud et al. | 340/5.61 |
| 6,664,888 B1 * | 12/2003 | Bishop | 340/426.11 |
| 6,683,527 B1 * | 1/2004 | Greenwood | 340/5.61 |

FOREIGN PATENT DOCUMENTS

| | | | |
|---|---|---|---|
| AU | 4940485 | 5/1987 | |
| EP | 1084 917 A1 | 3/2001 | B60R/25/04 |
| WO | WO 02/18186 A1 | 3/2002 | B60R/25/04 |

* cited by examiner

*Primary Examiner*—Anh V. La
(74) *Attorney, Agent, or Firm*—Fredrikson & Byron, P.A.

(57) ABSTRACT

A security system having security devices with hierarchical levels of access provided to coded keys which may be hand held transmitter units, is disclosed. The levels of access are master which is restricted to the manufacturer, seller and installer, supervisor which can be allocated to a site, and user which is usually specific to one security device only. The security devices can be programmed to be responsive to all of the supervisor coded keys and/or user coded keys, or a user coded key only. The security system can be used in a method of securing all vehicles at a car sales, where all of the vehicles can have their security devices programmed to be responsive to supervisor coded keys specific to the car sales site. When a vehicle is sold, its security device can be reprogrammed to be responsive to specific user coded keys only.

16 Claims, 2 Drawing Sheets

VEHICLE IMMOBILISER/ALARM

CROSS-REFERENCE TO RELATED APPLICATIONS

The present application claims priority from Australian Provisional Application No. 2002951399, filed 16 Sep. 2002 and Australian Provisional Application No. 2002951402, filed 16 Sep. 2002, the teachings of each of which are incorporated herein by reference.

1. Field of the Invention

This invention relates to a vehicle alarm or immobiliser, and in particular a vehicle immobiliser or alarm of the type incorporating a coded key for verification of control signals used to disarm (and preferably also to arm) the immobiliser or alarm.

2. Background Art

In a vehicle security system the method of deactivating is almost always by means of a coded key. The coded key may be a radio remote, a proximity device or a contact type such as a plug which is inserted into a socket. In order to offer security the number of codes should be high. In most modern security systems taking into account various encryption methods, the number of different codes can effectively be in the billions. Often the coded key is provided as a binary code which is serially transmitted to an immobiliser or car alarm. In modem security systems a transmitted code can have 64 bits, and taking into account various encryption methods, the number of different codes can be in the billions. In addition there is a system of encryption which uses "code-hopping", where the transmitted code has a portion thereof which increments by a predetermined amount determined by an algorithm in the coded key. The immobiliser responsive to the coded key incorporating the code-hopping technology includes a processor which is able to predict ahead a large number of increments, so that the immobiliser remains responsive to the coded key in the event that the coded key is caused to transmit several increments out of range of the immobiliser.

The security system is, in normal use, responsive to a unique allocated user code, so that the security system can be disabled and enabled by the owner of the vehicle in which it is installed. This user code is determined and programmed into the coded key during manufacture, and into the security system either during manufacture or alternatively the security system can learn the user code from the coded key, by placing the security system into a learning mode.

Motor vehicle dealers usually have many cars at one time in their car yard. The typical practice is to have the keys to the vehicles stored in a central secure location, such as in the sales office. Staff wishing to demonstrate a vehicle to a potential customer must retrieve the keys and any coded key remote control (or other type of coded key) for the vehicle beforehand.

It is an object of this invention to provide a system and method that can provide security to vehicles in a car yard or like establishment, and obviate the above difficulty.

Throughout the specification, unless the context requires otherwise, the word "comprise" or variations such as "comprises" or "comprising", will be understood to imply the inclusion of a stated integer or group of integers but not the exclusion of any other integer or group of integers.

DISCLOSURE OF THE INVENTION

The applicant has provided an improvement in security systems for vehicles which provides in a security system for one or more of a plurality of available supervisor codes, which allows one or more unique supervisor codes to be allocated to a motor vehicle dealer. The security system with unique supervisor code(s) allocated, is then responsive to respective supervisor code coded key(s), with limited permissions for control of security system features. This allows one or more unique supervisor codes to be allocated to a motor vehicle dealer.

The applicant has provided, in a preferred arrangement, an improvement in security systems for vehicles which provides in a security system a master code having full permissions for control of security system features using a master code coded key, a second tier of a plurality of supervisor codes from which one or more may be allocated and enabled, the enabled supervisor code(s) having limited permissions for control of security system features using one or more supervisor code coded keys. This also allows a unique second tier supervisor code to be allocated to a motor vehicle dealer.

The security system also of course, includes facility for one of a plurality of possible user codes to be allocated and enabled, for normal use by a final consumer/user using a user code coded key.

Either arrangement described above allows a single unique supervisor coded key to be used to disable all of the second tier supervisor code keyed vehicle security systems fitted to vehicles on the vehicle dealer car lot. This feature saves considerable time for a car lot operator wanting to demonstrate a car, as the ignition keys can safely be left in the vehicles.

Either arrangement may include a feature whereby the enabling of a supervisor code disables a user code, and vice versa.

In accordance with one aspect of the invention there is provided a security system including a security device arranged to exert control over a predetermined function, said security device being responsive to a coded key to exert control over said predetermined function, said coded key and said security device communicating using a data string of a predetermined format, wherein said data string includes a predetermined portion thereof having settable values, wherein said settable values when within a first predetermined range of values correspond to user codes assigned to user coded keys for said security device, and said settable values when within a second predetermined range of values correspond to supervisor codes assigned to supervisor coded keys for said security device, and said settable values when within a third predetermined range of values correspond to user codes assigned to master coded keys for said security device, wherein said security system includes programming means allowing said security device to be programmable to be responsive to one or more said supervisor coded keys and/or one or more said user coded keys, or one or more of said user coded keys only, wherein said supervisor coded keys have an intermediate level of access to said programming means between the level of access of said master coded keys and said user coded keys.

Typically, the supervisor coded keys can be provided to authorised personnel, while the user coded keys would be provided to users having more limited access. For example, in security systems such as vehicle immobilisers, supervisor coded keys could be provided to car sales staff, while user coded keys could be provided to customers who ultimately purchase the vehicle. In such an arrangement, user coded keys are always coded specifically for a particular security device. The master coded keys have a greater level of access than the supervisor coded keys, and are usually restricted to the security system manufacturer, seller, and installer. It should be understood that there may be one or more master coded keys.

Preferably said security system includes programming means allowing said security device to be programmable to be responsive exclusively to one or more said supervisor coded keys, or exclusively to one or more of said user coded keys only.

The second range of values may be conveniently limited to 65534 possible values. Within the data string there are a number of combinations available, based on other portions of code outside of the second range making up the remainder of the data string. In motor vehicle dealerships, this allows for 65534 different possible dealers codes, and a plurality of different remote controls incorporating identical second strings, for use by staff within the dealership.

In accordance with a second aspect of the invention there is provided a method of providing security against theft to a plurality of vehicles at a site, said method including steps of providing a security system as hereinbefore described, the security system comprising a plurality of security devices for selectively immobilising and enabling operation of vehicles, and installing said security devices in vehicles at said site, wherein all of said security devices are selectably responsive to one or more coded keys specific to said site.

Preferably said security devices are selectably responsive to said coded keys by being programmed to recognise code transmitted thereby.

Also in accordance with a second aspect of the invention there is provided a method of providing security against theft to a plurality of vehicles at a site, said method including steps of providing a security system as hereinbefore described, allocating said supervisor coded keys with supervisor codes specific to said site, installing a said security device in each of said vehicles at said site, and actuating said programming means to program each said security device to be responsive to said supervisor coded keys allocated to said site for selectively immobilising and enabling operation of vehicles, wherein all of said security devices are selectably responsive to one or more supervisor coded keys allocated to said site.

Preferably said security devices are responsive to said supervisor coded keys to actuate said programming means to program said security device to be solely responsive to code transmitted by one or more specific said user coded keys.

Preferably said security devices are incorporated in relays used to control a circuit essential for operation of the vehicle. An example of such a relay is described in the applicant's co-pending patent application PCT/AU01/01075, the contents of the specification for which are incorporated herein by cross-reference.

With this arrangement, a site can be provided with one or more coded keys, and security devices, responsive to the coded keys, for fitting into vehicles. With two or more adjacent sites having the same system in place, the security devices only respond to coded keys at the correct site.

BRIEF DESCRIPTION OF THE DRAWINGS

A preferred embodiment of the invention will now be described in the following description of a vehicle immobiliser made with reference to the drawings, in which.

BEST MODES(S) FOR CARRYING OUT THE INVENTION

A security system having security devices with hierarchical levels of access provided to coded keys which may be hand held transmitter units, is provided by the embodiment. The levels of access are master which is restricted to the manufacturer, seller and installer, supervisor which can be allocated to a site such as a car sales yard, and user which is usually specific to one security device only. The security devices can be programmed to be responsive to all of the supervisor coded keys and/or user coded keys, or a user coded key only. The security system can be used in a method of securing all vehicles at a car sales, where all of the vehicles can have their security devices programmed to be responsive to supervisor coded keys specific to the car sales site. When a vehicle is sold, its security device can be reprogrammed to be responsive to specific user coded keys only.

Figure 1:
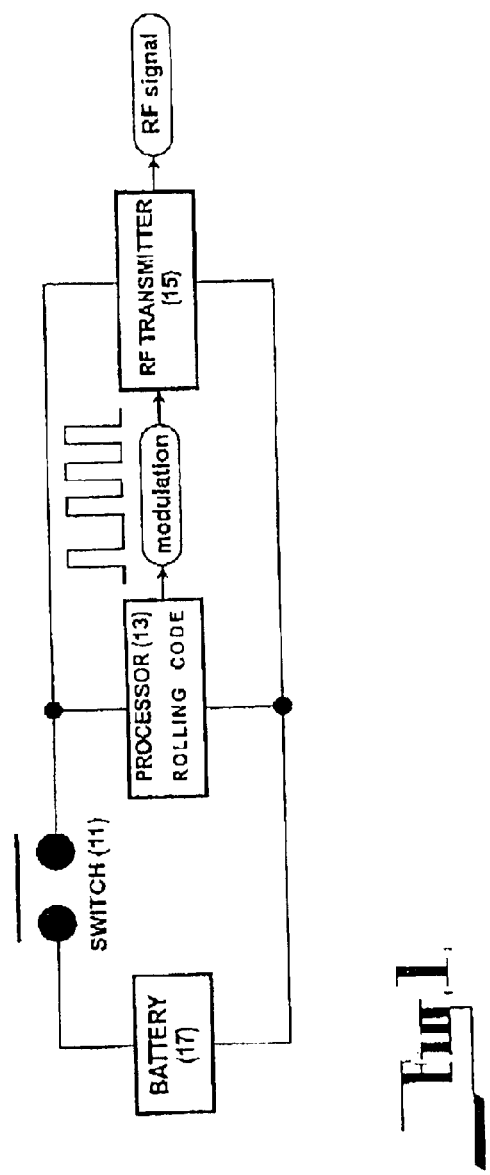
FIG. 1 is a block schematic of a coded key for use with the embodiment.

The security system according to the embodiment, for a vehicle, has a coded key in the form of a radio remote key, shown in FIG. 1. The radio remote key has a press button switch 11 used by a person to disable immobilization and enable immobilization of the vehicle to which the security device is fitted. The switch 11 is interfaced to a processor 13. The processor 13 is connected to output a serial code to a radio transmitter circuit 15, both the processor 13 and radio transmitter circuit 15 being powered by a power supply in the form of a battery 17. The processor 13 is responsive to the switch 11, and causes the transmitter circuit 19 to transmit a serial code in accordance with a program contained in ROM in the processor 13. The serial code includes a portion of rolling code which is incremented according to an algorithm contained in the program in the processor 13, providing so called "code-hopping". Code-hopping prevents evesdropping on the transmitted serial code, and unauthorized reproduction of a previously transmitted code being used to subsequently disable immobilization and steal the vehicle.

Figure 2:
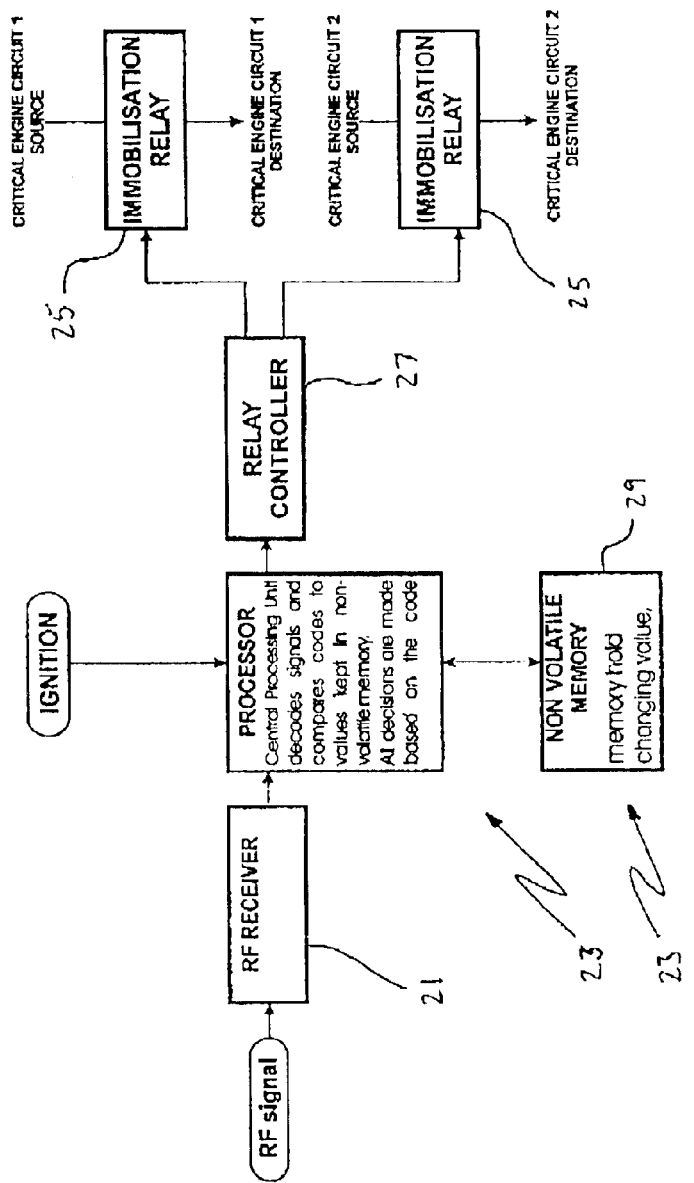
FIG. 2 is a block schematic of a security device incorporating the embodiment.

The security device, shown generally in FIG. 2, has a radio receiver circuit 21 which receives the radio signal transmitted from the radio remote key. The radio receiver circuit has a processor 23 connected to the receiver circuit 21, and receives the serial code from the receiver circuit 21. The processor 23 controls two relays 25 via a control circuit 27, the relays 25 in use being wired into circuits required for normal vehicle operation, such as the ignition circuit, fuel injection control circuitry, fuel pump, or starter motor actuation circuitry.

The processor 23 has both RAM 29 and ROM (not shown) in accordance with usual practice. A program installed on ROM in the processor 23 toggles the relays 25 between states, to disable immobilization and enable immobilization of the vehicle (enable and disable operation respectively of the vehicle). The program also auto-arms the immobilizer after the vehicle has been switched off for a predetermined time (usually about 30 to 60 seconds) or hasn't been started after the predetermined time. The program includes an algorithm to predict ahead for a large number of possible codes incremented according to the algorithm contained in the program in the processor 13 in the radio remote key.

In addition to this, the processor 23 in the security device is capable of "learning" codes from radio remote keys, when set in a condition to allow this.

The embodiment of the invention provides a vehicle dealership security system in the form of vehicle immobilisers for all cars on a car lot using identical supervisor codes. Any vehicle arriving on the lot can be fitted with a compatible security system, which is then programmed with the dealer's supervisor code. This enables all of the vehicles in the dealership to be operated by supervisor code coded keys which can be allocated to staff. With such an arrangement, all vehicles on the lot are protected, ignition keys can be left in the vehicles allowing rapid demonstration to a potential customer, and the security system can then be sold with the vehicle as it is already installed.

With the arrangement of the invention, there are a number of different code permutations available as master, supervisor, and user codes, as set out in the following table:

| | Code permutations | Used by |
|---|---|---|
| Master | 1 | Manufacturer only |
| Supervisor | 65,533 | Dealership |
| User | 4,294,901,757 | Purchaser |
| Rolling | 4,294,967,925 | Internal only |

The master code is a closely guarded code, which is only used by the manufacturer. In practise there would be at least one code available for each manufacturer, so a number of different manufacturers could utilise the invention and not ordinarily be able to access control of the opposition's product.

The master code uses 4 reserved bytes that are never repeated in any of the other type of codes. The master code coded key is used primarily to program supervisor codes, and may be used to program user codes recognised by the security devices installed in vehicles.

The following table represents a serial code string as produced by a master code coded key:

| FIXED CODES | | | | ROLLING CODES | | | |
|---|---|---|---|---|---|---|---|
| BYTE 0 | BYTE 1 | BYTE 2 | BYTE 3 | BYTE 4 | BYTE 5 | BYTE 6 | BYTE 7 |
| 11 h | 22 h | 33 h | 44 h | XX | XX | XX | XX |

XX = Don't care

The values contained in bytes 0–3 are 11h, 22h, 33h, 44h respectively. The first two bytes specify that this code is a "supervisor" code, however in combination with the 33h & 44h further specifies this is the "Master" code.

The supervisor code uses 11h and 22h in bytes 0 & 1 respectively, same as the master. However the supervisor codes have another 64,000+ combinations specified by bytes 2 & 3. The value combination of 33h & 44h in bytes 2 & 3 is the only illegal code for a supervisor code. Supervisor code coded keys are then used to program user codes recognised by the security devices installed in vehicles. Any given supervisor code coded key cannot program user codes into a security device coded with a different supervisor code coded key.

The following table represents a serial code string as produced by a supervisor code coded key:

| FIXED CODES | | | | ROLLING CODES | | | |
|---|---|---|---|---|---|---|---|
| BYTE 0 | BYTE 1 | BYTE 2 | BYTE 3 | BYTE 4 | BYTE 5 | BYTE 6 | BYTE 7 |
| 11 h | 22 h | ?? | ?? | XX | XX | XX | XX |

?? = Any code except 33 h & 44 h combination

The user code is the code programmed at the lowest level. User code coded remotes cannot program any other type of remote to be recognised by a security device installed in a vehicle.

User codes may use any combination of values in any byte except for 11h & 22h in bytes 0 & 1 respectively.

The following table represents a serial code string as produced by a supervisor code coded key:

| FIXED CODES | | | | ROLLING CODES | | | |
|---|---|---|---|---|---|---|---|
| BYTE 0 | BYTE 1 | BYTE 2 | BYTE 3 | BYTE 4 | BYTE 5 | BYTE 6 | BYTE 7 |
| \\ | \\ | XX | XX | XX | XX | XX | XX |

\\ = any code except 11 h & 22 h combination

The rolling code part of any code is the continually changing bytes, which provide the encryption for all codes. They are not recorded by the "real world" because they change each time the remote button is pressed.

Operation of a most preferred embodiment of the security system according to the invention will now be described.

In the electronic vehicle security system a number of deactivation codes are stored in non volatile memory, usually electrically erasable memory. In normal operation, as perceived by a final consumer, when a user code is received by the processor (from an external user code coded key) it is compared with the user code stored in memory. If a match is found the system will deactivate.

If a supervisor code is received the same holds true but in addition to checking the received code against unique codes stored in the memory a check is done to see if the received code is in fact a "supervisor code". A portion or all of the supervisor code, which is to be compared, is usually embedded in the read only memory of the processor. If a supervisor code is received the system will check a number of further settings usually contained in the electrically erasable memory. In most cases the most important check is to see if the supervisor code is allowed to deactivate the system. In addition to this a number of further actions may be taken if the correct command is received from the supervisor code coded key. A few examples may be the programming of new keys or the deletion of old keys from the memory. Changes in settings and operations may also be made with the supervisor key This is best explained by reference to the following examples. In a code hopping system the code sent by the remote is usually a 65 bit binary number. This data is encrypted for security and only a system with the correct decryption algorithm is able to decode the signal. If the signal is decoded using the correct algorithm, a 32 bit number known as the "fixed portion" of the code is available. This number is programmed into the encoder at time of manufacture. In a system according to the invention, a dedicated number would be chosen to represent a "supervisor code" coded key. This number would not be used in the production of final consumer user code coded keys.

For example the supervisor code (In hex) could be 12,34, XX,XX where X is a variable. If the processor decodes the signal and finds the number is 12,34,XX,XX it knows it has received a supervisor code. The balance of the fixed code represented by XX,XX may be checked against a value stored in non volatile memory to see if is the correct supervisor code for that particular dealership.

This method can provide 65,534 different supervisor codes. This may be useful because one vehicle dealer should not have the same "supervisor code" as another dealer. In addition to this it provides additional security. If one of the supervisor code coded keys is lost or stolen then the vehicles equipped with security system in the dealers lot may be programmed to not respond to the stolen supervisor code coded key.

In the most preferred embodiment, a hierarchal system of codes is used. There is one dedicated master code that can be used to program the security system to accept one of the supervisor codes (one of 65,534). In addition to being able to deactivate the security systems the master may be used to program a new user code coded key into the security system, when the vehicle is sold to a customer.

For security, whenever a normal user code coded key is programmed into the security system, the security system is configured to ignore the supervisor code(s). This is to ensure that once the customer has taken delivery of the vehicle it will not respond to a supervisor code coded key. Although the supervisor code number is still stored in the security system, a bit in the non volatile memory is set. Once this bit is set the security system will ignore a supervisor code if it is received.

In a simple, non code hopping system the supervisor code can be one or more dedicated codes. The same principles apply as with the code hopping system.

The hierarchical three tier master control system has number of advantages but the main one is the ability to take a standard security system and have different levels of control of the system. It is also possible for the program to accept any one of 65,000 different master codes. The advantages are that all the systems that are produced are identical. The supervisor code that they will respond to is only programmed in prior to delivery to a particular customer The system works in three levels. At the top of the pyramid is the master code coded key, followed by supervisor code coded keys and finally user code coded keys. These coded keys all are in the form of hand held push button remotes. The difference between the various types is in the code they transmit to the security system.

Due to the proximity of car dealerships to each other and the competitive nature of the business, it is important for each dealership to have a different supervisor code. It is important for this supervisor coded remote be able to communicate with all the installed remote security system immobilisers on the lot. The supervisor remote should be able to be used to reprogram user coded remote controls into the immobilisers. Once a end user coded remote is programmed by the supervisor remote into the immobiliser the supervisor codes are forgotten. The only way however, that a new user coded remote can be code in to the immobiliser is still via the original remote for that dealership.

Further up the chain it is important before delivery to be able to code the immobilisers with the supervisor code for the dealership. To do this a master coded remote is provided which provides the precoded environment to accept the next hierarchy of supervisor coded remotes.

In the master coded remote, a Microchip code hopping, encrypted encoder is used. The decoding is performed in a Microchip 12C509 microprocessor with an external non volatile memory (EEROM.) In the encoder a serial number is programmed in at time of manufacture. This serial number is known as the fixed portion of the code and usually no two remotes are ever coded with the same code. In the security system of the embodiment, one specific code is designated to be the "master code". If the microprocessor in the security system receives a valid signal from a coded key (remote control) it will first check to see if the encrypted part of the code is correct and then, if it is, will check the serial number. If the serial number matches a predetermined code designated to be a master code the security device will behave in a different manner and allow a number of programming options not allowed by other remotes.

For example in a 64 bit serial number, the master code could be 11,22,33,44 in hex. If this code is received by the microprocessor (after decryption), the system will respond in a different way, allowing more programming options to be performed. The number assigned to the master coded key is embedded in the firmware of the microprocessor and is not changeable after production. Apart from the 64 bit code the system has a further 2 bits of information available. These are set by the encoder and are dependent on two data lines. In the remote control these are connected to the activation switches. These switches in combination with the ignition switch give a total of 6 different commands that can be sent to the security system. In the system described only 4 are used.

An master coded key remote has the ability to do the following:

1 Disarm the system
2 Delete a master remote
3 Program a new master remote
4 Program in a user key In the hierarchy, under the master coded key there are supervisor coded key remotes. These have less privileges than the master coded key. They can do the following:

1 Disarm the system
2 Program in a user coded key

If a code is received by a security device, it is checked to see if it came from a master coded key remote control. If it did not then it is checked to see if it is from a supervisor coded key remote. To do this it checks a portion of the code. For example the a supervisor code could be 10,10,XX,XX where XX,XX is one of 65,000 different master codes. When the microprocessor checks the received code and finds 10,10 in the first 2 bytes it knows it has received a signal from a supervisor coded key. It then goes and checks the remainder of the code (represented by XX,XX) against the supervisor code number stored in the EEROM. If this number is correct the microprocessor checks a bit in the EEROM to see if a supervisor coded key has permission to disarm the system. If it does then the system disarms. If not the code is rejected.

If the ignition is on at the time the microprocessor receives a valid supervisor code from the second button then it will allow either itself to be programmed back into memory or a new user key programmed into memory.

User remotes can only arm and disarm the system. If a code is received by the microprocessor and it is not an master code nor is it a supervisor code, then the code, once decrypted is checked against a list of valid codes stored in the EEROM. If the code is found in the EEROM then the system disarms. The only way the user coded key remote code can be programmed into the EEROM is by means of either the master or supervisor coded key remote controls.

This "Hierarchical Control System" allows the efficient programming of mass security systems for car dealerships, offers a non clashing decoding environment for these businesses and further allows restricted reprogramming within each dealership with total control by the distributor or engineering workshop.

In a vehicle dealership a number of security systems are installed into the vehicles on the lot. If a security system is installed the ignition keys may be left in the vehicle without fear of the vehicle being stolen because the vehicle will not start unless the security system is first deactivated. A salesman wanting to demonstrate a particular vehicle to a potential buyer must first deactivate the security system. If the security system is "supervisor code enabled" then the salesman may use a supervisor coded key to deactivate the security system allowing the vehicle to be demonstrated. The salesman's supervisor coded key would work on all vehicles with an installed security system in the particular lot. With a short range system or passively arming immobilisers, it would not be important if a few vehicles in the vicinity of the operator were deactivated as the non target vehicles would re-arm within 30 seconds.

The advantage to the vehicle dealership is that they may leave the keys in the ignition of the vehicle. This alleviates the problem of locating the correct keys for the vehicle if a customer wishes to have the vehicle demonstrated to them. A further advantage to the vehicle dealership is the fact that many customers would want a security system fitted to the vehicle when they purchase it. In this case the system is already fitted and all that is required is for the master code to be deleted from memory and individual user coded keys be programmed into the security system before the customer takes delivery of the vehicle.

It should be appreciated that the scope of the invention is not limited to the particular embodiment or application thereof described herein.

What is claimed is:

1. A security system including a security device arranged to exert control over a predetermined function, said security device being responsive to a coded key to exert control over said predetermined function, said coded key and said security device communicating using a data string of a predetermined format, wherein said data string includes a predetermined portion thereof having settable values, wherein said settable values when within a first predetermined range of values correspond to user codes assigned to user coded keys for said security device, and said settable values when within a second predetermined range of values correspond to supervisor codes assigned to supervisor coded keys for said security device, and said settable values when within a third predetermined range of values correspond to master codes assigned to master coded keys for said security device, wherein said security system includes programming means allowing said security device to be programmable to be responsive to one or more said supervisor coded keys and/or one or more said user coded keys, or one or more of said user coded keys only, wherein said supervisor coded keys have an intermediate level of access to said programming means between the level of access of said master coded keys and said user coded keys.

2. A security system as claimed in claim 1 wherein said programming means allows said security device to be programmable to be responsive exclusively to one or more said supervisor coded keys, or exclusively to one or more of said user coded keys only.

3. A method of providing security against theft to a plurality of vehicles at a site, said method including steps of providing a security system as claimed in claim 1, allocating said supervisor coded keys with supervisor codes specific to said site, installing a said security device in each of said vehicles at said site, and actuating said programming means to program each said security device to be responsive to said supervisor coded keys allocated to said site for selectively immobilising and enabling operation of vehicles, wherein all of said security devices are selectably responsive to one or more supervisor coded keys allocated to said site.

4. A method as claimed in claim 3 wherein said security devices are responsive to said supervisor coded keys to actuate said programming means to program said security device to be solely responsive to code transmitted by one or more specific said user coded keys.

5. A method of providing security against theft to a plurality of vehicles at a site, said method including steps of providing a security system as claimed in claim 2, allocating said supervisor coded keys with supervisor codes specific to said site, installing a said security device in each of said vehicles at said site, and actuating said programming means to program each said security device to be responsive to said supervisor coded keys allocated to said site for selectively immobilising and enabling operation of vehicles, wherein all of said security devices are selectably responsive to one or more supervisor coded keys allocated to said site.

6. A method as claimed in claim 5 wherein said security devices are responsive to said supervisor coded keys to actuate said programming means to program said security device to be solely responsive to code transmitted by one or more specific said user coded keys.

7. A coded key adapted for use in the security system of claim 1.

8. A coded key according to claim 7, wherein said key is selected from the group consisting of supervisor coded keys, master coded keys, and user coded keys.

9. A coded key according to claim 8, wherein said key is provided in the form of a radio remote key.

10. A security device adapted for use in the security system of claim 1.

11. A vehicle having a security device according to claim 10 installed therein.

12. A security system according to claim 1, wherein said security device is incorporated in a relay used to control a circuit essential for operation of the vehicle.

13. A security system as claimed in claim 12 wherein said programming means allows said security device to be programmable to be responsive exclusively to one or more said supervisor coded keys, or exclusively to one or more of said user coded keys only.

14. A coded key adapted for use in the security system of claim 13.

15. A coded key according to claim 14, wherein said key is selected from the group consisting of supervisor coded keys, master coded keys, and user coded keys.

16. A coded key according to claim 15, wherein said key is provided in the form of a radio remote key.

* * * * *